(12) United States Patent
Gusler et al.

(10) Patent No.: US 6,567,509 B1
(45) Date of Patent: May 20, 2003

(54) METHOD AND SYSTEM TO EXTEND FUNCTIONALITY OF VOICE PROCESSING SYSTEMS

(75) Inventors: Carl Phillip Gusler, Austin, TX (US); Rick A. Hamilton, II, Austin, TX (US); Maulin Ishwarbhai Patel, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/359,611

(22) Filed: Jul. 22, 1999

(51) Int. Cl.[7] .............................................. H04M 15/00
(52) U.S. Cl. ............................... 379/112.01; 379/88.18; 379/111; 379/133
(58) Field of Search ................................. 379/113, 112, 379/133, 111, 112.01, 112.06, 112.09, 67.1, 88.18, 88.22, 112.07, 32.01, 32.04

(56) References Cited

U.S. PATENT DOCUMENTS

| | | | |
|---|---|---|---|
| 5,404,528 A | | 4/1995 | Mahajan ..................... 395/650 |
| 5,555,416 A | | 9/1996 | Owens et al. ............... 395/700 |
| 5,623,540 A | * | 4/1997 | Morrison et al. ........... 379/115 |
| 5,832,068 A | * | 11/1998 | Smith ......................... 379/113 |
| 5,859,978 A | | 1/1999 | Sonderegger et al. .. 395/200.56 |
| 5,920,873 A | * | 7/1999 | Van Huben et al. ......... 707/203 |
| 6,252,946 B1 | * | 6/2001 | Glowny et al. .......... 379/88.22 |

OTHER PUBLICATIONS

International Business Machines Corporation; AIX Direct Talk 6000 Sixth Edition.

International Business Machines Corporation; Voice Response for AIX, General Information and Planning Version 2 Release 2.

* cited by examiner

*Primary Examiner*—Rexford Barnie
(74) *Attorney, Agent, or Firm*—Duke W. Yee; David A. Mims, Jr.; Betty G. Formby

(57) ABSTRACT

A method for managing phone activity records in an automated voice processing system. In a preferred embodiment, phone activity data from the automated voice processing system is periodically written into a first file. The phone activity data corresponds to a period of time. Prior data in the first file is overwritten each time new phone activity data is written into the first file. Prior to data being overwritten in the first file, the phone activity data from the first file is placed into a master file with prior phone activity records. The master file provides a history of phone activity within the automated voice processing system.

14 Claims, 5 Drawing Sheets

```
                605      610       615      620            625              630
                 \        \         \        /              /                /
            localhost, 1998.06.13 00:00:00,Best_Bank,CCARD_CANCELED,40
            localhost, 1998.06.13 00:00:00,Best_Bank,CUST_TRANSFER,503
            localhost, 1998.06.13 00:00:00,Best_Bank,Credit_Limit,285
            localhost, 1998.06.13 00:00:00,Best_Bank,INVALID_SSN,353
            localhost, 1998.06.13 00:00:00,Best_Bank,Lost_Payment,518
            localhost, 1998.06.13 00:00:00,Best_Bank,ROTARY_CALL,894
            localhost, 1998.06.13 00:00:00,Best_Bank,SUCCESSFUL_ACTI,42
            localhost, 1998.06.13 00:00:00,Best_Bank,SUCCESSFUL_CANC,40
            localhost, 1998.06.13 00:00:00,Best_Bank,TOTAL_CALLS,6167
            localhost, 1998.06.13 00:00:00,Best_Bank,TRSFR_AGENT,4025
            localhost, 1998.06.13 00:00:00,Best_Bank,TTONE_CALL,5239
            localhost, 1998.06.13 00:00:00,Best_Bank,UNSUCCESSFUL_AC,672
            localhost, 1998.06.13 00:00:00,Best_Bank,UNSUCCESSFUL_CA,59
            localhost, 1998.06.13 00:00:00,China_Trust2,422302001,6
            localhost, 1998.06.13 00:00:00,China_Trust2,422303001,3       ⌒ 635
            localhost, 1998.06.13 00:00:00,China_Trust2,430591007,2
            localhost, 1998.06.13 00:00:00,China_Trust2,542694002,2
            localhost, 1998.06.13 00:00:00,China_Trust2,ACTIVATE_CARD,4
            localhost, 1998.06.13 00:00:00,China_Trust2,CCARD_INFO,1
            localhost, 1998.06.13 00:00:00,China_Trust2,ROTARY_CALL,9
            localhost, 1998.06.13 00:00:00,China_Trust2,TOTAL_CALLS,29
            localhost, 1998.06.13 00:00:00,China_Trust2,TRSFR_AFT_HRS,25
            localhost, 1998.06.13 00:00:00,China_Trust2,TTONE_CALL,20
            localhost, 1998.06.13 00:00:00,China_Trust2,UNSC_ACTIVATE_C,5
            localhost, 1998.06.13 00:00:00,FICI_Card,422302001,2
            localhost, 1998.06.13 00:00:00,FICI_Card,426923000,7
            localhost, 1998.06.13 00:00:00,FICI_Card,426923200,2
            localhost, 1998.06.13 00:00:00,FICI_Card,426923210,3
            localhost, 1998.06.13 00:00:00,FICI_Card,430593008,3
            localhost, 1998.06.13 00:00:00,FICI_Card,443118000,3
```

*FIG. 6*

METHOD AND SYSTEM TO EXTEND FUNCTIONALITY OF VOICE PROCESSING SYSTEMS

BACKGROUND OF THE INVENTION

1. Technical Field

The invention relates generally to computer software and more specifically to computer automated services. The invention relates even more specifically to automated voice processing systems.

2. Description of Related Art

With today's explosive growth in both the computer and the telecommunications industries, companies are increasingly looking for ways in which to leverage their information systems operations by merging previously separate functions. A common example of such a technological marriage is the wide-ranging acceptance of voice processing systems that provide menuing and other automated services to callers. One such product in this field is DirectTalk; a cross-platform licensed program product used by private industry, colleges and universities, and government agencies. (DirectTalk is a trademark of International Business Machines Corporation in Armonk, N.Y.) However, as the demand for such products grows, customer-desired functionality sometimes jumps ahead of official product releases.

One limitation of these automated services involves the use of call archives. These archives are records of past calls, and often, the data contained in them is mission critical for the organization. In many cases, in fact, these logs present themselves as billable records, without which a customer organization would be unable to collect revenue from various clients. Here, unfortunately, a problem with the current designs presents itself. Calls may be archived in various time intervals, such as weekly, monthly, or any other desired period. However, the archived records can only be printed for the interval for which they have been archived.

At first, the problem with this may not be apparent. However, in considering that high-volume call centers find the need to archive call information daily, the dilemma begins to show itself. In such high-volume centers, the records have to be printed daily and inserted into physical files. Then, at the end of the billing cycle, the customer organization has to assign people the tedious task of manually adding up the call records from all of the daily printouts. This wasteful exercise has been a source of great frustration to organization customers and has reduced their satisfaction with these products.

A solution to this problem is so greatly desired that organization clients have spent tens of thousands of dollars on information technologist (IT) specialists to find a workaround. Therefore, it is desirable to have an automated caller service that has the ability to print phone activity records for any range of dates, regardless of the archiving frequency, thus freeing organization customers from menial tasks and saving them money.

SUMMARY OF THE INVENTION

The present invention provides a method for managing phone activity records in an automated voice processing system. In a preferred embodiment, phone activity data from the automated voice processing system is periodically written into a first file. The phone activity data corresponds to a period of time. Prior data in the first file is overwritten each new time phone activity data is written into the first file. Prior to data being overwritten in the first file, the phone activity data from the first file is placed into a master file with prior phone activity records. The master file provides a history of phone activity within the automated voice processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts a sample of the contents of the master file.

DETAILED DESCRIPTION OF THE PREFERRED EMBODIMENT

Figure 1:
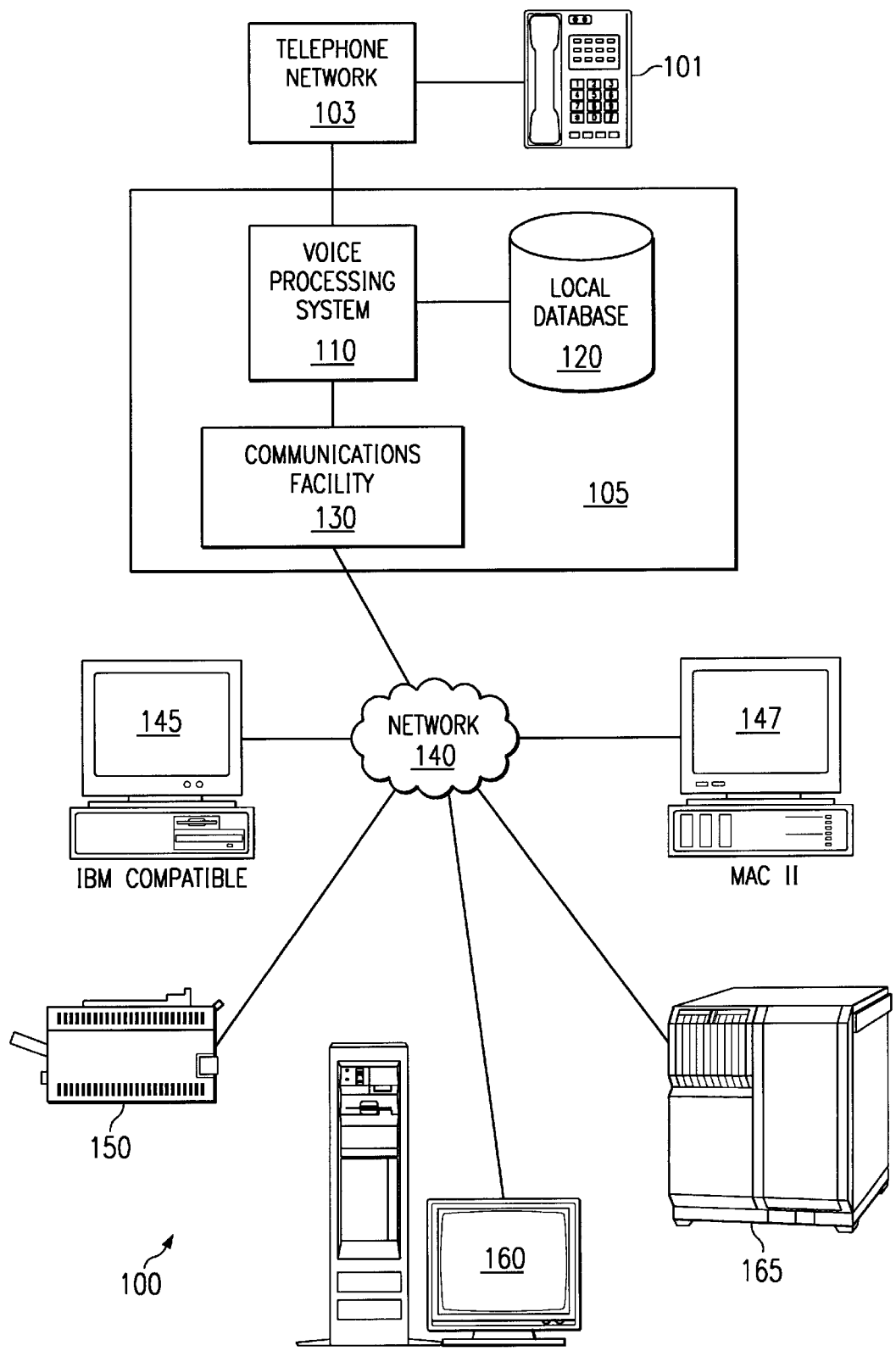
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

A network server 105, such as an IBM RS/6000, includes a voice processing system 110, such as DirectTalk for AIX or AIX DirectTalk/6000 products from International Business Machines Corporation (IBM). More information about DirectTalk for AIX may be found in "DirectTalk for AIX: General Information and Planning," version 2, release 2, published by IBM Corporation; and more information about AIX DirectTalk/6000 may be found in "General Information and planning: AIX DirectTalk/6000" Release 6, published by IBM.

Voice processing system 110 receives voice information from telephone 101 via telephone network 103, which is connected to server 105. Voice processing software applications 110 interact with callers using spoken prompts. Callers interact with voice processing system 110 using speech or telephone 101 keypad. Voice processing system 110 accesses data from local database 120 in response to commands received from callers and also writes information to local database 120 based on responses received from the callers.

In addition to interacting with callers, voice processing system 110 automatically collects information about each call. The information includes how many calls access each application, where in the call flow a caller hangs up, and how often a specific event occurs. An event is anything that a user defines as an event, such as the caller pressing a key. Voice processing system 110 automatically logs this information for the user. The user can view the information online or have voice processing system 110 generate and print reports automatically at preset intervals or whenever a user desires.

Voice processing system 110 also maintains information about online usage, such as how much activity took place on each channel, what applications are being called, and statistics about the sessions and the links to all remote computers. These statistics include the maximum number of sessions available at any one time. The user can view all of this information online or in printed form, in the same way as the call information.

In addition to the pre-determined report formats that the user can view online or print, the user can also export the raw data from the database in which it is held and process it to produce reports of their own.

Voice processing system 110 also may access information and write data to databases located on remote computers, via network 140. Server 105 includes a communications facility 130 to facilitate communications between voice processing software 110 and remote computers.

Distributed data processing system 100 is a network of computers in which the present invention may be implemented. Distributed data processing system 100 contains network 140, which is the medium used to provide communications links between various devices and computers connected within distributed data processing system 100. Network 140 includes printer 150, client machines 145 and 147, and network servers 160 and 165. Network 140 may also include permanent connections, such as wire or fiber optic cables, or temporary connections made through telephone connections.

Network 140 may include more or fewer devices than are depicted in FIG. 1. Furthermore, network 140, as shown, is a local area network ("LAN"). However, network 140 may be other kinds of networks, such as, but not limited to, wide area networks ("WANs").

FIG. 1 is intended as an example and not as an architectural limitation for the processes of the present invention.

Figure 2:
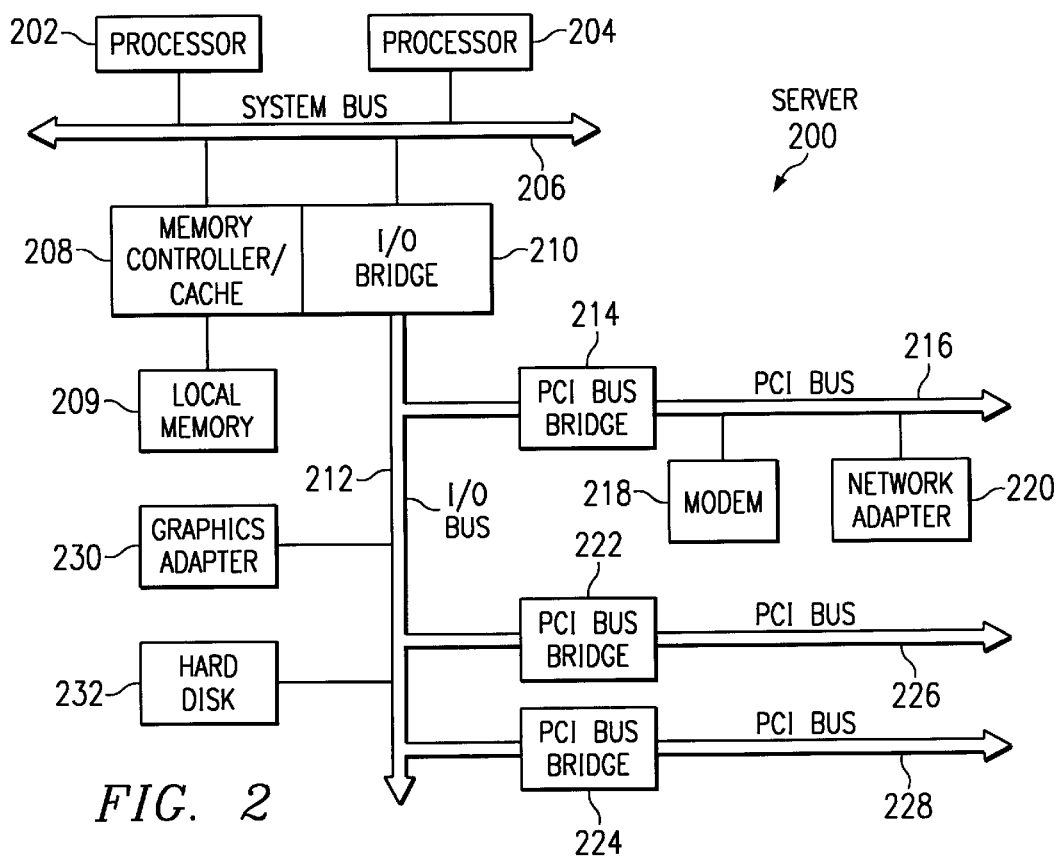
FIG. 2 depicts a block diagram of a data processing system that may be implemented as a server in accordance with the present invention.

Referring to FIG. 2, a block diagram of a data processing system which may be implemented as a server, such as server 105 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, N.Y., running the Advanced Interactive Executive (AIX) operating system.

Figure 3:
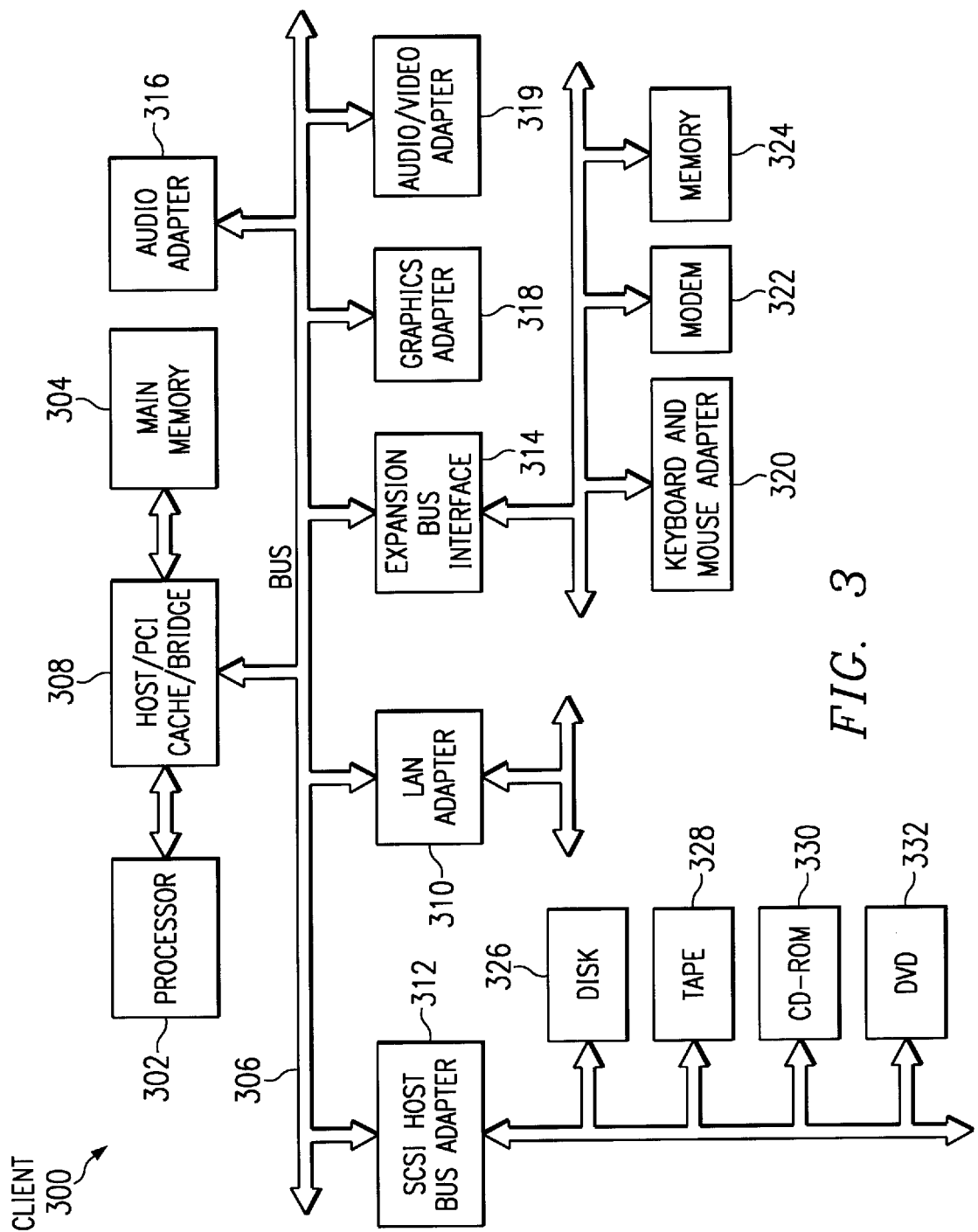
FIG. 3 illustrates a block diagram of a data processing system in which the present invention may be implemented.

With reference now to FIG. 3, a block diagram of a data processing system in which the present invention may be implemented is illustrated. Data processing system 300 is an example of a client computer such as client machines 145 and 147. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
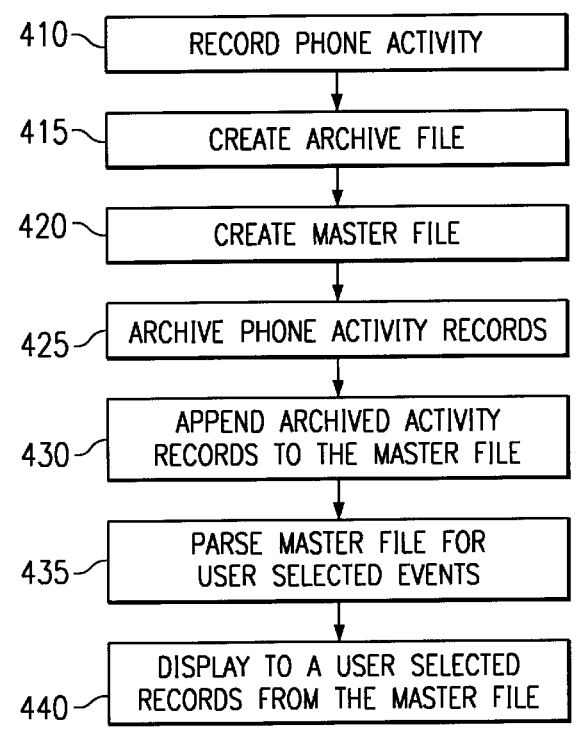
FIG. 4 is a flow chart illustrating a preferred embodiment for allowing phone activity records to be printed for any range of dates.

A flowchart illustrating a preferred embodiment for allowing phone activity records to be printed for any range of dates is depicted in FIG. 4. As each call is processed, voice processing system 110 records the information associated with the call, such as which applications were accessed, at what point in the call flow the caller hung up, the occurrences of specific events, and a time and date stamp indicating when the call took place and what the duration of the call was (step 410). An event is anything that a user defines as an event, such as the caller pressing a key. Voice processing system 110 creates an archive file (step 415) and a master file (step 420). The phone activity records are archived into the archive file on a periodic basis (step 425).

Each time the phone activity records are archived into the archive file, the archive file is appended to the master file (step 430). It should be noted that the archive file is overwritten each time the phone activity records are archived. Thus, by appending each archive file to the master file (step 430), all of the phone activity records are contained in one file; therefore, there is no need to manually add up call records from periodic printouts of the archive file. Thus, significant time and expense is saved.

Whenever a user desires to have selected events from the phone activity records displayed, the voice processing system parses through the master file to find the requested information (step 435). This information is then displayed to the user (step 440). Since the master file contains all of the phone activity records, a set of records can be displayed for a period of time not corresponding to any interval of archiving.

Figure 5:
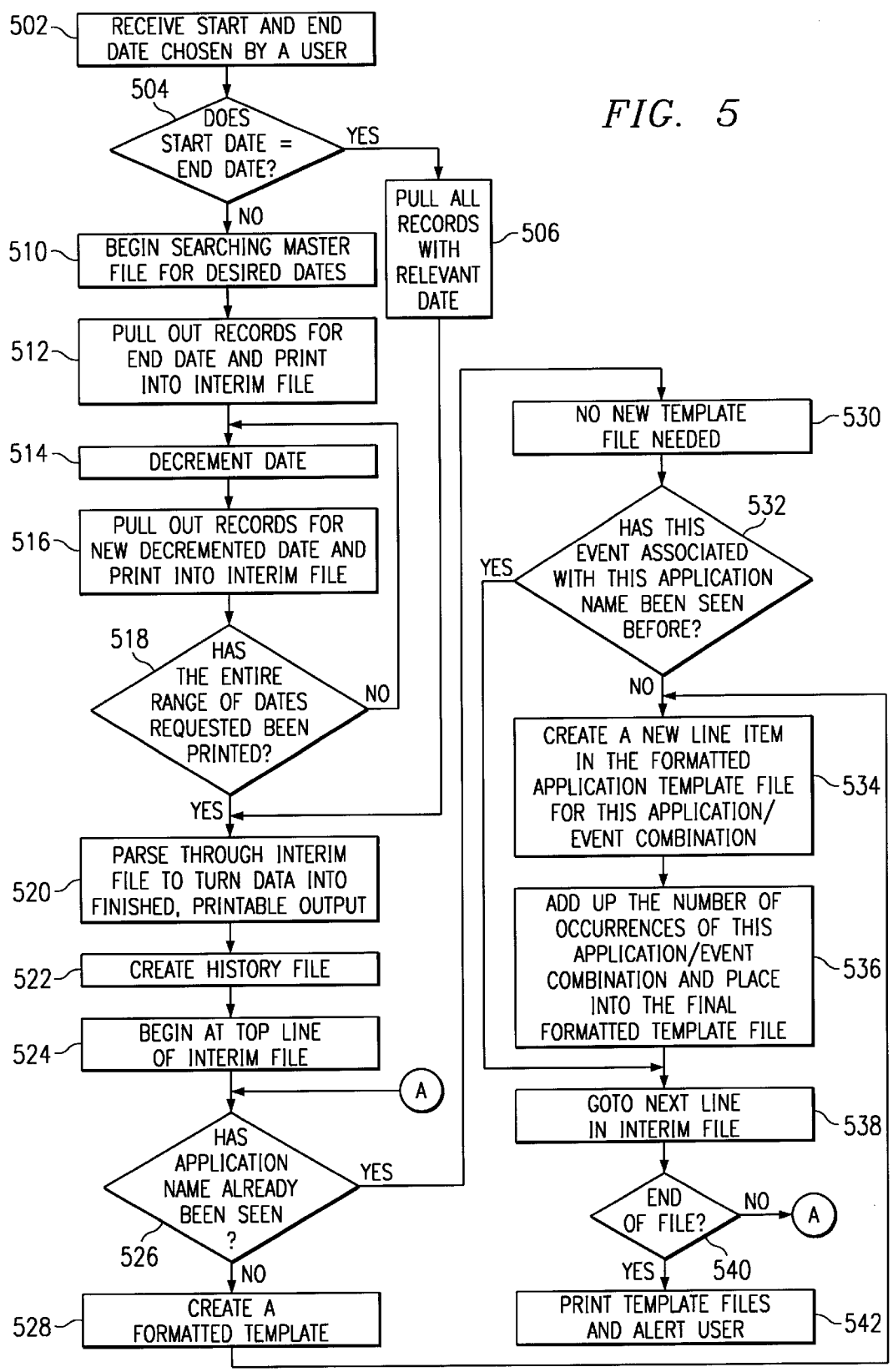
FIG. 5 is a flowchart illustrating a method for displaying requested user information contained in the master file.

Turning now to FIG. 5, a flowchart illustrating a method for displaying requested user information contained in the master file is depicted. A user requests information about events and applications that occurred between a starting and an ending date (step 502). If any old files exist, they are moved to *.old so that they are not overwritten. The date entered by the user is reformatted, such that it is in the form yyyy.mm.dd, where yyyy is a four-digit number representing the year; mm is a number between "01" and "12," representing the month of the year; and dd is the day of the month, a number between "01" and "31." If the start date and the end date provided by the user are the same (step 504), then all records with the relevant date are pulled out of the master file and printed into an interim file (step 506).

If the end date and the start date are not the same, then the master file is searched for the desired dates (step 510), and the records for the end date are pulled out and printed into an interim file (step 512). The day of the month part of the date is decremented by one (step 514). If the day portion of the date chosen is "01," it makes the next day "31"; otherwise, the day is the current day minus one. If the day has just been reset from "01" to "31," then the month is decremented if the current month is not "01." If the day has just been reset from "01" to "31," and the current month is "01," the month is reset to "12." If the day was reset from "01" to "31," and if the month was just reset from "01" to "12," then the year is decremented by one.

Next, the records from the master file corresponding to the new decremented date are pulled out, and these records are printed into the interim file (step 516). Steps 514 and 516 are repeated until the records on the starting date have been printed into the interim file (step 518).

Once records for the entire range of dates requested has been printed to the interim file at step 518, then the interim file is parsed to turn the data into a finished, printable output (step 520). First, a history file is created (step 522). The history file shows which application names/event combinations have already been selected and placed into their respective files. Note that, if multiple application names have been selected, then a separate printout will exist for each company. Each printout will have all events for that application for the entire date range requested.

Beginning at the top of the interim file, the file is examined to determine whether the application name has already been seen, by looking into the history file (step 524). (Of course, the first time it will not have been seen). If it has not been seen before, then a formatted template is created for this company, where the template file is a separate file to be printed (step 528). In the new template file, a line item is created for this application and event type (step 534). All of the occurrences of this application and event combination are pulled out, and the number of occurrences of this application/event combination are added up and placed into the final formatted template file (step 536). Then, the next line in the interim file is processed (step 538).

Returning to step 526, if the application name has already been seen, then no new template file is needed (step 530). Next, it is determined whether this event associated with this application name has been seen before (step 532). If it has, the process flows to the next line in the interim file (step 538). If it has not been seen before, then a new line item is created in the formatted application template file for this application/event combination (step 534). Next, the number of occurrences of this application/event combination are totaled and placed into the final formatted template file (step 536). Once this has been completed, the process flows to the next line in the interim file (step 538)

Once the next line in the interim file has been reached (step 538), it must be determined if this is the end of file (step 540). If it is the end of the file (step 540), then the template files are printed and the user receiving the files is alerted that they are going to the printer (step 542). If it is not the end of the file (step 538), the process reverts to step 526, and the process is repeated for the next line in the interim file.

Turning now to FIG. 6, there is depicted a sample of the contents contained in the master file. The first line in the master file contains six entries: 605, 610, 615, 620, 625 and 630. Each entry corresponds to different information about a group of calls of a specified type received by the voice processing system on a specified day. The first entry 605 contains the name of the host machine that processed the group of calls. The host name may be anything the internal administrators wish to call a machine. Second entry 610 contains the date for which the group of specified types of calls was received. In this case, the date for line 1 is Jun. 13, 1998. Third entry 615 is a time stamp, which is not used because this file contains a compilation of all calls of a specified type that occurred on a specified date; therefore, the entry is 00:00:00. Fourth entry 620 contains the name of the client about whom the caller accessed information. In this case, the client name for line 1 is Best_Bank. Fifth entry 625 is the type of event that occurred. In the case of line 1, the recorded event is the cancellation of a credit card. The sixth and final entry 630 is the number of times that event occurred for that client on the specified day. For example, on Jun. 13, 1998, 40 callers called the voice processing system and cancelled credit cards for client Best_Bank. Each line contains the date and number of events for a different client/event pair. Other client information is also contained in this master file. For example, entry 635 lists the name of a different client—specifically, China_Trust2.

In a specific implementation of the present invention, three associated scripts perform the tasks required to extend the functionality of DirectTalk, a voice processing system from IBM. The three scripts are "dtmaster.ksh,"

"dtprint.ksh," and "dtbackend.ksh." The script "dtmaster.ksh" runs in parallel with standard DirectTalk archiving. If archiving is run nightly, for example, then dtmaster.ksh would be run nightly as well. The purpose of this script is to concatenate the archive files into a master file containing open-ended historical data. "Dt.event.master" is the file created and maintained by "dtmaster.ksh." A sample copy of this file is shown in FIG. 6. The master file is necessary because the DirectTalk-generated archive files, such as "/u/dirTalk/archive_dir/oamlog/Event.arc," are overwritten as each round of archiving occurs.

"Dtprint.ksh" is the script called by the user for all print jobs. This is a user selection interface which, in turn, calls "dtbackend.ksh." "Dtbackend.ksh" is the file that actually parses through the "Dt.event.master," finds the requested events, formats them into a DirectTalk standard printout form, and sends them to the printer. One reason that the function is divided into "dtprint.ksh" and "dtbackend.ksh" is so that "dtbackend.ksh" may be called automatically by other scripts or crontab entries if desired by the user.

dtmaster.ksh

The following is a sample script for concatenating the archive files into a master file containing open-ended historical data.

```
#!/bin/ksh
####################################################################

# dtmaster.ksh                         Rick Hamilton, IBM Global Services
#                                      Mar. 30, 1998

# Purpose: This file is meant to be called from the crontab, and
# it facilitates the printing of DirectTalk files. It is used in
# conjunction with the scripts "dtprint.ksh" and "dtbackend.ksh."
# The primary function of this script is to create and maintain a
file,
# which will in turn be accessed by the referenced scripts.

# Also, currently printing all customers for previous day.

# Note: THIS SCRIPT SHOULD NOT BE RUN MANUALLY, UNLESS ALL CODE
# BETWEEN POINT A AND POINT B IS COMMENTED OUT, AS IT WILL PLACE
# DUPLICATE ENTRIES INTO THE MASTER FILE.

# Working version:      Mar. 18, 1998
# Version 1.0:          Mar. 30, 1998
####################################################################

# define variables
most_recent_date=" "
integer line_count
integer total_master_lines
integer start_date
integer end_date
integer s_year
integer s_month
integer s_day
print_file=/tmp/print_trash
master_file=/u/dirTalk/archive_dir/oamlog/Dt.event.master
total_master_lines=$(cat $master_file | wc -1)
# Point A
####################################################################
# First, let's move the existing masterfile into a temporary
# storage position.
####################################################################
if [[ -w /u/dirTalk/archive_dir/oamlog/Dt.event.master ]]
then
    mv /u/dirTalk/archive_dir/oamlog/Dt.event.master /u/dirTalk/archive_dir/oamlog/Dt.event.master.temp
fi
####################################################################
# In case of problem during debug, let's copy the Event.arc into
# /tmp.
####################################################################
if [[ -w /tmp/Event.arc ]]
then
    mv /tmp/Event.arc /tmp/Event.arc.yesterday
fi
cp /u/dirTalk/archive_dir/oamlog/Event.arc /tmp/Event.arc
```

-continued

```
######################################################################
# Now, copy the archive file into the masterfile's place.
######################################################################
if [[ -w /u/dirTalk/archive_dir/oamlog/Event.arc ]]
then
      cp /u/dirTalk/archive_dir/oamlog/Event.arc
/u/dirTalk/archive_dir/oamlog/Dt.event.master
fi
######################################################################
# Finally, append the old file onto the new masterfile. This results
# in new entries being "prepended," such that the newer entries
# are listed first, and the older entries listed subsequently.
######################################################################
if [[ -w /u/dirTalk/archive_dir/oamlog/Dt.event.master.temp ]]
then
      cat /u/dirTalk/archive_dir/oamlog/Dt.event.master.temp >>
/u/dirTalk/archive_dir/oamlog/Dt.event.master
fi
rm /u/dirTalk/archive_dir/oamlog/Dt.event.master.temp
# Point B
######################################################################
# Send automated print jobs to printer.
######################################################################
######################################################################
# For now, sending all customers to printer, with yesterday's
# events:
######################################################################
# Find out what yesterday's date was. This will be in format of
# 1998.03.28. After finding it, convert it to a format that
# dtbackend.ksh likes, using yesterday as both start and end date.
most_recent_date=$(head -n 1 $master_file | cut -f 1 -d " " | cut -f
2 -d ".")
#echo $most_recent_date       # debug statement
s_year=$(echo $most_recent_date | cut -f 1 -d ".")
#echo "s_year is $s_year"
s_month=$(echo $most_recent_date | cut -f 2 -d ".")
#echo "s_month is $s_month"
s_day=$(echo $most_recent_date | cut -f 3 -d ".")
#echo "s_day is $s_day "
start_date=$s_year*10000+$s_month+$s_day
#echo "start_date is $start_date"
end_date=$start_date
# echo "end date is $end_date"
# Now call dtbackend.ksh to print all of yesterday's events.
echo "Calling dtbackend.ksh $start_date $end_date 99"
/usr/local/bin/print.scripts/dtbackend.ksh $start date $end_date 99

``` dtprint.ksh

The following is a sample script for that may be used as the file dtprint.ksh which is the script called by the user for all print jobs. This is a user-selection interface which in turn calls "dtbackend.ksh."

```
#!/bin/ksh

# FUNCTIONS: dtprint.ksh

# (C) COPYRIGHT International Business Machines Corp. 1997
# All Rights Reserved
# Licensed Materials - Property of IBM

# US Government Users Restricted Rights - Use, duplication or
# disclosure restricted by GSA ADP Schedule Contract with IBM Corp.

# FILE NAME: dtprint.ksh

# FILE DESCRIPTION: Korn shell script for printing DirectTalk archive
files
#       between user-supplied dates.    Note that this file is a frontend
```

-continued

```
for
#       its sister file, dtbackend.ksh. This file actually prompts the
user for
#       a customer name, converts it to its numeric equivalent, and
passes
#       it to dtbackend.ksh. The files have been separated so that any
#       automated script, such as might be alled from a cron job, can
#       simply call the backend, passing to it the appropriate numeric
#       customer number.

# FILE HISTORY:   Written for First Independent Computer Incorporated
#       Written by Rick Hamilton
IBM Global Services
(512) 469-8223

# Draft version:           November, 1997
# Tested version:          Mar. 16, 1998
# Version 0.99:            Mar. 24, 1998
###################################################################
#########
###################################################################
#########
# Define files and variables
###################################################################
#########
trash_file_1=/tmp/dt.trash.file.1
trash_file_2=/tmp/dt.trash.file.2
valid_customer=FALSE
start_arg=" "         # Text version of start date argument
end_arg=" "           # Text version of end date argument
integer s_month       # holds month data
integer e_month       # holds month data
integer s_day         # holds day data
integer e_day         # holds day data
integer s_year        # holds year data
integer e_year        # holds year data
integer t_month
integer t_day
integer t_year
integer start_date    # holds numeric start date
integer end_date      # holds numeric end date
integer this_date     # numeric date pulled from master file
integer this_line     # tracks our way through the file
integer lines_in_master    # total number of lines in master file
integer customer_number    # which customer to print out records for
###################################################################
#########
# Function to print usage statement.
###################################################################
#########
function print_usage
{
    echo " "
    echo "dtprint usage: dtprint <start date> <end date> "
    echo " where start and end dates are in format mm.dd.yyyy"
    echo " Example: dtprint 12/01/1997 01/31/1998 "
    echo " prints all entries for December and January of the
referenced years."
    echo " Note that end date must be AFTER start date, and that
single digit"
    echo " numbers, such as 1 should be entered as 01."
    echo " "
    exit 1
}
###################################################################
#########
# Check the user inputs for valid dates. Format should be:
#       dtprint <start date> <end date>
# where start and end dates are mm.dd.yyyy

# If user inputs invalid, print usage statement.
###################################################################
#########
```

-continued

```
#######################################
# If less or more than two arguments...
#######################################
if [ $# != 2 ]
then
      print_usage   # instruct user on format, then exit
fi
#######################################
# Put arguments into text fields
#######################################
start_arg=$1
end_arg=$2
echo $start_3arg > $trash_file_1
echo $end_arg > $trash_file_2
#if [ $(cat $trash_file_1 | wc -c) -ne 11 ]
#then
print_usage
fi

#if [ $(cat $trash_file_2 | wc -c) -ne 11 ]
#then
print_usage
fi
#######################################
# if mm > 12, print usage statement
#######################################
s_month=$(cat $trash_file_1 | cut -c 1,2)
e_month=$(cat $trash_file_2 | cut -c 1,2)
if [[ (s_month -gt 12) || (e_month -gt 12) ]]
then
      print_usage
fi
#######################################
# if dd > 31, print usage statement
#######################################
s_day=$(cat $trash_file_1 | cut -c 4,5)
e_day=$(cat $trash_file_2 | cut -c 4,5)
if [[ (s_day -gt 31) || ( e_day -gt 31 ) ]]
then
      print_usage
fi
####################################################################
# Assign the start date and end date to local numeric variables,
####################################################################
s_year=$(cat $trash_file_1 | cut -c 7-10)
e_year=$(cat $trash_file_2 | cut -c 7-10)
start_date=$s_year*10000+$s_month*100+$s_day
#echo "start_date=$start_date"
end_date=$e_year*10000+$e_month*100+$e_day
#############################################
# if yyyy < 1995 or yyyy > 2010, print usage statement
#############################################
if [[ (start_date -1t 19950000 ) || ( end_date -gt 20100000 ) ]]
then
      print_usage
fi
################################################
# if start date AFTER end date, print usage statement
################################################
if [[ start_date -gt end date ]]
then
      print_usage
fi
###############################################################
# If we reach this point, we have a valid user input. Prompt the
#    user for a customer.
###############################################################
while [[ $valid_customer = FALSE ]]
do
      echo " "
      echo "                              dtprint"
      echo "                   Version 1.0, Copyright 1998 by IBM Corp."
      echo "Please enter the number corresponding to the desired application:"
      echo " "
      echo "1. Best Bank (BB_Main)              6. CT_CardPac"
      echo "2. Best Bank (BestBank)             7. FICI_Card"
      echo "3. American Gas                     8. Security_State"
      echo "4. China Trust                      9. ST-Debug"
```

-continued

```
    echo "5. PSG"
    echo " "
    echo "                           99. All companies"
    echo ""
    read customer_number?"> "
    if   [[ customer_number -eq 1 ]] ||
         [[ customer_number -eq 2 ]] ||
         [[ customer_number -eq 3 ]] ||
         [[ customer_number -eq 4 ]] ||
         [[ customer_number -eq 5 ]] ||
         [[ customer_number -eq 6 ]] ||
         [[ customer_number -eq 7 ]] ||
         [[ customer_number -eq 8 ]] ||
         [[ customer_number -eq 9 ]] ||
         [[ customer_number -eq 99 ]]
    then
         valid_customer=TRUE
    else
         echo "Invalid customer number!"
    fi
done
# Call the backend with the appropriate parameters
#echo ""
#echo "Executing dtbackend.ksh $start_arg $end_arg $customer_number"
echo ""
echo "Started at 'date'"
dtbackend.ksh $start_date $end_date $customer_number
echo "Completed at 'date'"

``` dtbackend.ksh

The following is a sample script that may be used as "dtbackend.ksh." This file that actually parses through the "Dt.event.master," finds the requested events, formats them into a DirectTalk standard printout form, and sends them to the printer. A flowchart illustrating the function of this script is shown in FIG. 5 which was described above.

```
#!/bin/ksh

# FUNCTIONS:    dtbackend.ksh

# (©) COPYRIGHT International Business Machines Corp. 1997
# All Rights Reserved
# Licensed Materials - Property of IBM

# U.S. Government Users Restricted Rights - Use, duplication or
# disclosure restricted by GSA ADP Schedule Contract with IBM Corp.

# FILE NAME: dtbackend.ksh

# FILE DESCRIPTION: Korn shell script for printing DirectTalk archive
files
#     between user-supplied dates. Note that this file is a backend script
#     to be either called by dtprint.ksh or some other script with knowledge
#     of customer numbers.

#     Note also that a user would generally use the file dtprint.ksh, along
#     with appropriate input parameters, as that file checks for syntax, etal.
#     This file is only called by dtprint.ksh or a crontab entry! Although
#     some syntax checks may be made within this script, any such checks
#     are merely legacy code from the days that these two files were one,
#     and they should not be taken as complete syntax checks.

# FILE HISTORY: Written for First Independent Computer Incorporated
#     Written by Rick Hamilton
IBM Global Services
(512) 469-8223
#     First Draft:    November 1997
#     Working Copy:   Mar. 17, 1998
```

-continued

```
#     Version 1.0     Mar. 30, 1998     #033098
#          - Added text to send output files to printer.
#          - Shortened name of formatted target.
#          - Added copy of previous formatted target to .old
#     Version 1.01    Mar. 30, 1998
#          - Removed debug file creation to speed up operation.
#     Version 1.1     Apr. 1, 1998      #040198
#          - Combined two history file checks.
#          - Added whole concept of "interim_file" checks to reduce times
#     Version 1.2     Apr. 1, 1998      #040198a
#          - Expanded use of greps to reduce file iterations, with BIG
#          speed-up of performance.
#     Version 1.3     Apr. 9, 1998      #040998
#          - Changed search algorithm FROM stopping when previous day
encountered
#          TO stopping when entries are TWO days past target.
#     Version 1.4     Jun. 29, 1998     #062998
#          - Corrected stupid mistake where I was searching for
"BestBank"
#          and DT was logging it as "Best_Bank." Also added status
messages
#          and commented out unnecessary debug line.
# NOTE: This version was based on version 1.4, even though some
changes
#          were made to 1.4 (creating version 1.5) online. Relevant
changes
#          from 1.5 were also carried forward to subsequent versions as
needed.
#     Version 1.6     Sep. 23, 1998     #092398
#          - Made changes to speed up multi-day print jobs. Old method
parsed
#          through each line of file. New method calculates what dates
lie between
#          desired dates and grep for each date in master file.
#     Version 1.7     Nov. 02, 1998     #110298
#          - Put in addition to check for zero length raw targets,
printing
#          message to user and exiting if no events found within
specified dates.
######################################################
###########
```

```
###########################################################
# Define files and variables
###########################################################
# Master file that we'll be parsing from
master_file=/Dt_test/invention/Dt.event.master.sample
#master_file=/u/rick/projects/fici/event.arc
# file containing the formatted files to print
files_to_print=/tmp/dtfiles_to_print
# /tmp file that our "raw" output will be placed into
raw_target=/tmp/dt.output.raw
# /tmp file that our "interim" output will be placed into. This
# will contain just the event/app combos for recording.
interim_target=/tmp/dt.output.interim
echo " " >/tmp/debug.info
# /tmp file that our formatted/translated output will1 be placed into
formatted_target=/tmp/dt.output           #033098
# /tmp file for keeping history of app/event occurrences
history_file=/tmp/dt.history.tmp
###########################################################
# A note on the variables below. It seems that a given company can be
# identified by multiple labels within the archive file. An example of
# this would be BB_Main and Best_Bank for "Best Bank." Accordingly, we need
# to have target text strings (for comparison purposes) that we can use to
#match each possible identifier. Thus, we have menu choices in the
# companion script "dtprint.ksh" for each text string. The variable below,
# target_company will take on a value according to which user choice was
# selected.
###########################################################
target_company=" "     # First text string to search for
this_line_text=" "     # Text for each line we're parsing
this_app=" "           # Name of this application
this_event=" "         # Name of each event
history_text=" "       # Text line from history file
user_friendly_start_date=" "   # printable text
user_friendly_end_date=" "     # printable text
date_term=" "
integer t_month                # this month, day, and year in int form
integer t_day
integer t_year
c_month=" "
c_day=" "
c_year=" "
use_c_day=" "
use_c_month=" "
integer start_date             # holds numeric start date
integer end_date               # holds numeric end date
integer this_date              # numeric date pulled from master file
integer this_line              # tracks our way through the file
integer lines_in_master        # total number of lines in master file
integer lines_in_history       # number of lines in history file
integer total_apps             # total number of different apps in our
raw_target
integer master_pointer         # pointer to apps
integer event_hits             # track number of app/event occurrences
integer continue               # generic "keep going" flag
integer are_we_there_yet       # track whether we've considered all
dates # 092398
integer template_needed        # do we need a new app template?
integer record_combo           # do we need to record/consider this
event/app combo?
record_combo=1                 # flag to record an event combination
template_needed=1              # shows whether we ve already created a
template for the app
continue=1                     # loop continuation flag
are_we_there_yet=0             # another loop continuation flag
# 092398
echo "Running dtbackend.ksh version 1.7, written Nov. 2, 1998."
# 110298
###########################################################
# If old output files exist, move them to .old, so that we have a
record of last
# print output.
###########################################################
if [ -w $files_to_print ]
then
    mv $files_to_print $files_to_print.old
    touch $files_to_print
fi
if [-w $raw_target ]
then
    mv $raw_target $raw_target.old
    # echo "Print job requested at:">$raw_target
    # echo 'date'>>$raw_target
    touch $raw_target
fi
###########################################################
# Assign start and end dates, and recalculate printable dates
###########################################################
start_date=$1
end_date=$2
user_friendly_start_date=$(echo $start_date | cut -c 5,6)/$(echo
$start_date | cut -c 7,8)/$(echo $start_date | cut -c 1-4)
user_friendly_end_date=$(echo $end_date | cut -c 5,6)/$(echo
$end_date | cut -c 7,8)/$(echo $end_date | cut -c 1-4)
###########################################################
# Now assign the target_company variable per the following rules:

#       1 == BB_Main
#       2 == Best_Bank
#       3 == AmericanGas
#       4 == China_Trust
#       5 == PSG
#       6 == CT_CardPac
#       7 == FICI_Card
#       8 == Security_State
#       9 == ST-Debug
#       99 == All companies within the date range given.

###########################################################
if [[ $3 -eq 1 ]]        # We want BB_Main (Best Bank)...
then
    target_company="BB_Main"      # ... so search on this term!
elif [[ $3 -eq 2 ]]      # We want Best_Bank...
then
    target_company="Best Bank"    # ... so search on this term!
#062998
elif [[ $3 -eq 3 ]]      # We want American Gas ...
then
    target_company="AmericanGas"  # ... so search on this term!
elif [[ $3 -eq 4 ]]      # We want China Trust ...
then
    target_company="China Trust"  # ... so search on this term!
elif [[ $3 -eq 5 ]]      # We want PSG ...
then
    target_company="PSG"          # ... so so search on this term!
elif [[ $3 -eq 6 ]]      # We want CT_Cardpac ...
then
    target_company="CT_Cardpac"   # ... so search on this term!
elif [[ $3 -eq 7 ]]      # We want FICI_Card ...
then
    target_company="FICI_Card"    # ... so search on this term!
elif [[ $3 -eq 8 ]]      # We want Security_State ...
then
    target_company="Security_State" # ... so search on this term!
elif [[ $3 -eq 9 ]]      # We want ST-Debug ...
then
    target_company="ST-Debug"     # ... so search on this term!
elif [[ $3 -eq 99 ]]     # We want all companies ...
then
    target_company=","            # ... so search on this term!
else                     # No appropriate companies selected
    echo "Bad company choice: $3"
    exit 1
fi
# put in nice formatting ...
```

```
if [[ $target_company = "," ]]
then
    echo "Searching for all events between $user_friendly_start_date
and $user_friendly_end_date."
else
    echo "Searching for $target_company events between
$user_friendly_start_date and $user_friendly_end_date."
fi
######################################################
# Begin parsing the master file for any occurrences of events that
# happened between the start and end dates.

# For each line in cat'ed file, pull out date fields. These will
already
# be in proper format, so we need to convert them to a numeric value
# which we use for comparison. Assign them to the variable
this_date.

# Note below, if we have a single date, we will simply grep on that
date
# in the master file and pull out the appropriate events.
######################################################
if [[ start_date -eq end_date ]]    #040998 - this whole stanza
then
    date_term=$(echo $user_friendly_start_date | cut -c 7-10).
$(echo $user_friendly_start_date | cut -c 1,2).$(echo
$user_friendly_start_date | cut -c 4,5)
    # echo "date_term is $date term"
    # echo "Press return to continue"
    # read
    grep $date_term $master_file | grep $target_company >
$raw_target
######################################################
#########
# Let's think about what we're doing for the multiple date entries.
We want
# to construct a raw file with the most recent entries (i.e., the end date) at
# the top, and the oldest entries at the bottom. Furthermore, the dates that
# we can grep on will have to iterate downward, for instance to print from
# Dec. 20, 1998 to Jan. 10, 1999, we will have to assign date_term to
# each of the following:
#       1998.01.10
#       1998.01.09
#       1998.01.08
#       "
#       1997.12.31
#       1997.12.30
#       "
#       1997.12.20
######################################################
#######
else    # we're doing a muitiple date entry #040998
begin 092398
######################################################
#########
    # use the end date as a starting point, and put the first entry into the
    # raw_target. Note that the awkward use of switch statements is
for
    # formatting purposes. Originally, I had integer values here, but
when
    # we cut them, "09" become "9" etc.
######################################################
#######
    t_year=$(echo $user_friendly_end_date | cut -c 7-10)
    t_month=$(echo $user_friendly_end_date | cut -c 1,2)
    t_day=$(echo $user_friendly_end_date | cut -c 4,5)
######################################################
    # Although the cut-and-paste of the following code (from a place
    # lower in the code body) is inefficient in terms of space, it
    # gets the job done. Basically, the following is designed to
    # format the days and months correctly, with a leading "0" in
    # front of the number for single-digit dates.
################################################ if [[ $t_day -eq 1 ]]
then
    c_day="01"
    use_c_day=true
elif [[ $t_day -eq 2 ]]
then
    c_day="02"
    use_c_day=true
elif [[ $t_day -eq 3 ]]
then
    c_day="03"
    use_c_day=true
elif [[ $t_day -eq 4 ]]
then
    c_day="04"
    use_c_day=true
elif [[ $t_day -eq 5 ]]
then
    c_day="05"
    use_c_day=true
elif [[ $t_day -eq 6 ]]
then
    c_day="06"
    use_c_day=true
elif [[ $t_day -eq 7 ]]
then
    c_day="07"
    use _c_day=true
elif [[ $t_day -eq 8 ]]
then
    c_day="08"
    use_c_day=true
elif [[ $t_day -eq 9 ]]
then
    c_day="09"
    use_c_day=true
fi
# finished formatting days, now handle months.
if [[ $t_month -eq 1 ]]
then
    c_month="01"
    use_c_month=true
elif [[ $t_month -eq 2 ]]
then
    c_month="02"
    use_c_month=true
elif [[ $t_month -eq 3 ]]
then
    c_month="03"
    use_c_month=true
elif [[ $t_month -eq 4 ]]
then
    c_month="04"
    use_c_month=true
elif [[ $t_month -eq 5 ]]
then
    c_month="05"
    use_c_month=true
elif [[ $t_month -eq 6 ]]
then
    c_month="06"
    use_c_month=true
elif [[ $t_month -eq 7 ]]
then
    c_month="07"
    use_c_month=true
elif [[ $t_month -eq 8 ]]
then
    c_month="08"
    use_c_month=true
elif [[ $t_month -eq 9 ]]
then
    c_month="09"
    use_c_month=true
fi
```

-continued

```
        if [[ $use_c_day ="true" && $use_c_month = "true" ]]
        then
                date_term=$t_year.$c_month.$c_day
        elif [[ $use_c_day = "true" ]]
        then
                date_term=$t_year.$t_month.$c_day
        elif [[ $use_c_month = "true" ]]
        then
                date_term=$t_year.$c_month.$t_day
        else
                date_term=$t_year.$t_month.$t_day
        fi
        #echo "date_term is $date_term."   # debug statement
        #echo "Press return to continue."
        #read
        echo "Gathering records for $date_term."
        # echo "This company is $target_company."
        # echo "Press return to continue."
        # read
        grep $date_term $master_file | grep $target_company > $raw_target
##########################################################

        # We now have the first (end) date grepped and in our raw_target. Start
        # decrementing according to the following rules, given that we are at
        # month/day/year:
        #
        # RULES FOR NEW_DAY:
        # if day = 1, new_day = 31 (so we perform one extra grep for months with
        #                 30 days, big deal.)
        # else, new_day = day-1
        #
        # RULES FOR NEW_MONTH:
        # if day != 1, new_month = month
        #
        # if day = 1 and month != 1 , new_month = month-1
        #
        # else (if day = 1 and month = 1), new_month = 12
        #
        # RULES FOR NEW_YEAR:
        # if day = 1 and month =1, new year = year-1
        #
        # else, new_year = year
##########################################################

# Reset our values:
use_c_day=false
use_c_month=false
while [[ $are_we_there_yet -eq 0 ]]
do
        ###########################################
        # decrement day. If it is 1, reset to 31.
        ###########################################
        if [[ $t_day -eq 1 ]]
        then
                t_day=31
        else
                t_day=$t_day- 1
        fi
##########################################################
        # decrement month. Note above, we've already decremented the day.
        # Thus, we decrement the month if the day is 31, NOT 1. I.e., we've
        # already set the day clock back, now do the month if appropriate.
#################################################### if [[ $t_day -ne 31 ]]              # no month action is necessary
        then
                echo " " > /dev/null        # do nothing to month.
##########################################################
        # below, if the day is 31, that indicates that we were on the first
        # of the month, and that the month should be decremented. If the
        # current month is not 1, simply decrement it.
##########################################################
        elif [[ $t_day -eq 31 && $t_month -ne 1 ]]
        then
                t_month=$t_month-1
        else                                # the day condition was met above, so
                t_month=12                  # just set the date back to Dec.
        fi
##########################################################
        # decrement year if day and month were just set to Dec. 31.
##########################################################
        if [[ $t_day -eq 31 && $t_month -eq 12 ]]
        then
                t_year=$t_year-1
        fi
##########################################################
        # assign new date term, with careful attention to formatting.
        # First we format the days, then we format the months.
##########################################################
        # echo "About to set c_* values. t_day is $t_day and t_month is $t_month."
        # echo "Press return to continue."
        # read
        if [[ $t_day -eq 1 ]]
        then
                c_day="01"
                use_c_day=true
        elif [[ $t_day -eq 2 ]]
        then
                c_day="02"
                use_c_day=true
        elif [[ $t_day -eq 3 ]]
        then
                c_day="03"
                use_c_day=true
        elif [[ $t_day -eq 4 ]]
        then
                c_day="04"
                use_c_day=true
        elif [[ $t_day -eq 5 ]]
        then
                c_day="05"
                use_c_day=true
        elif [[ $t_day -eq 6 ]]
        then
                c_day="06"
                use_c_day=true
        elif [[ $t_day -eq 7 ]]
        then
                c_day="07"
                use_c_day=true
        elif [[ $t_day -eq 8 ]]
        then
                c_day="08"
                use_c_day=true
        elif [[ $t_day -eq 9 ]]
        then
                c_day="09"
                use_c_day=true
        fi
# finished formatting days, now handle months.
        if [[ $t_month -eq 1 ]]
        then
                c_month="01"
                use_c_month=true
        elif [[ $t_month -eq 2 ]]
        then
                c_month="02"
                use_c_month=true
        elif [[ $t_month -eq 3 ]]
```

-continued

```
            then
                    c_month="03"
                    use_c_month=true
            elif [[ $t_month -eq 4 ]]
            then
                    c_month="04"
                    use_c_month=true
            elif [[ $t_month -eq 5 ]]
            then
                    c_month="05"
                    use_c_month=true
            elif [[ $t_month -eq 6 ]]
            then
                    c_month="06"
                    use_c_month=true
            elif [[ $t_month -eq 7 ]]
            then
                    c_month="07"
                    use_c_month=true
            elif [[ $t_month -eq 8 ]]
            then
                    c_month="08"
                    use_c_month=true
            elif [[ $t_month -eq 9 ]]
            then
                    c_month="09"
                    use_c_month=true
            fi
            # echo "use_c_day is $use_c_day and use_c_month is $use_c_month."
            # echo "c_day is $c_day and c_month is $c_month."
            # echo "t_day is $t_day and c_month is $t_month."
            # echo "Press return to continue."
            # read
            if [[ $use_c_day ="true" && $use_c_month ="true" ]]
            then
                    date_term=$t_year.$c_month.$c_day
            elif [[ $use_c_day ="true" ]]
            then
                    date_term=$t_year.$t_month.$c_day
            elif [[ $use_c_month = "true" ]]
            then
                    date_term=$t_year.$c_month.$t_day
            else
                    date_term=$t_year.$t_month.$t_day
                    fi
            # Reset our values in any case.
            use_c_month=false
            use_c_day=false
            #echo "Now grepping for this date $date"
            #echo "Press return to continue."
            #read
            ############################################
            # Is this date equal to or earlier than start date?
            # Note that if the date is equal, then it is time to
            # mark the flag and make this our final grep.
            ############################################
                    # debug statements:
            # echo "t_month = $t month and my start month =
$user_friendly_start date | cut -c 1,2"
            # echo "t_day = $t_day and my start day =
$user_friendly_start_date | cut -c 4,5"
            # echo "t_year = $t_year and my start year =
$user_friendly_start_date | cut -c 7–10"
            if [[ $(echo $user_friendly_start_date | cut -c 1,2) -ge
$t_month && \
                    $(echo $user_friendly_start_date | cut -c 4,5) -ge
$t_day && \
                    $(echo $user_friendly start date | cut -c 7–10) -ge
$t_year ]]
            then
                    ###################################
                    # this is the last one to include
                    ###################################
                    are_we_there_yet=1
            fi

###################################
            # in any event, pull it into the raw_target.
            ###################################
            grep $date_term $master file | grep $target_company >>
$raw target
                    echo "Gathering records for $date_term."
                    done
            fi          # done with "else multiple date print requested."
                    # end 092398
    # echo "Please wait . . . this may take a few minutes."
    # lines_in_master=$(cat $master_file | wc -1)
    # this line=1
    #
    # echo "lines in master = $lines in master" # debug statement
    #
    # while [[ $this line -le $lines_in_master ]]
    # do
    #       echo "Creating raw file. Finished $this line of
$lines in master lines."
    #           above added 062998
    #           ###################################
    #           # Isolate each line in the following manner:
    #           ###################################
    #           this_line_text=$(head -n $this_line $master file | tall -n 1)
    #           #echo "this line_text=$this iine text"
    #
    #           ###################################
    #           # We now have a single line in this_line_text. The statement
    #           # below returns non-zero (evaluates true) if a given line in
    #           # the master contains the target company text.
    #           ###################################
    #
    #           if [[ echo $this_line_text | grep $target_company | wc -c
-ne 0 ]]
    #           then
    #
    #           ###################################
    #           # Above, we only progress with the following if our
    #           # company is in the line. Below, gather the date
    #           # into a form that we can use.
    #           ###################################
    #
    #           t_year=$(echo $this_line_text | cut -f 2 -d "," | cut -f
1 -d . )
    #           #echo "t_year=$t_year"
    #
    #           t_month=$(echo $this_line_text | cut -f 2 -d .)
    #           #echo "t_month=$t_month"
    #
    #           t_day=$(echo $thls_line_text | cut -f 3 -d . | cut -f 1
-d " ")
    #           #echo "t_day=$t_day"
    #
    #           this_date=$t_year*10000+$t_month*100+$t_day
    #           #echo "this_date=$this_date"
    #
    #
    #           ###################################
    #           # At this point, let's make a sanity check which will
    #           # save time in the long run. Since archiving is
performed
    #           # daily, and since we will be prepending the daily
archives
    #           # into the master file, we expect to see a collection of
    #           # of entries with a given date, then a collection of
    #           # entries with the previous day's date, then a collection
    #           # with the (even more) previous day's date, ad nauseum.
    #           # Since a parse of a huge file could be very time
    #           # consuming, we will perform a comparison of the date
    #           # between this (currently-considered) entry and the
    #           # user-supplied start date. If we have gone TWO DAYS
beyond #040998
```

-continued

```
#       # (before) the start date, then we can abort the search
#       # at this point, rather than continuing through the
#       # file until its conclusion.
#       ######################################

#       if [[ $this_date -lt $start_date-1 ]]
#       then
#       #echo "Breaking out of while loop on date $this_date"
#       #echo "while considering $this_line_text."
#       break # jump out of this while loop
#       fi

#       ######################################
#       # See if this_date lies between the start and end.
#       # If so, knowing that the target company matches the
#       # company in this line, save it to raw target file.
#       # Note also that, from the above check, we know the
#       # current date is greater than or equal to our start
#       # date, so no additional check on that is required.
#       ######################################

#       if [[ $this_date -le $end_date ]] && [[ $this date -ge
$start_date ]] #040998
#       then
#            echo $this_line_text >> $raw_target
#       fi

#       # echo "This date is $this_date."
#       # echo "Start date is $start_date."
#       # echo "End date is $end_date."

#       fi

#       ######################
#       # repeat for all lines
#       ######################

#       this_line=$this_line+1
#       #echo "Parsing line $this_line"
# done

# fi    # done with "else multiple date print requested."

# Tell the user that things are going okay
echo ""
echo "Finished parsing the archive file. Translating and formatting
results."
echo "Please wait . . . this may take a few minutes."
############################################################

# We have now finished creating the raw output. At this point, we
turn our
# attention to creating the formatted output.
############################################################

# echo "">>$raw_target
# echo "Data compilation completed and print job submitted
at: ">>$raw_target
# echo 'date' >>$raw_target
# echo "Printing results file to default printer."
#qprt -c $raw_target
#echo "Now at start of formatting. Size of raw target is:"
#echo 'ls -al $raw_target'
#echo "Press return to continue:"
# read
############################################################

# The general format desired by the customer is as follows, with a
separate
# formatted target being created for each application in the raw
target:

#               dtprint Event Report

# System: <hostname>           Printed: <'date'>
# Activity From: <start date>  To: <end date>
# Application: <ApplicationName>

# ----------------------------------------------------------------

#               Event            |      Event
#               Name             |      Count
#          ----------------------|---------------------------
#                                |

#         <first event name>     |  < first event count>
#            < etc >              |      < etc>
# ----------------------------------------------------------------

############################################################

############################################################

# The general approach to parse through the raw_target and find the
first
# application name. In most cases, there will only be one
application,
# We will then count each event name associated with that
application,
# parsing through the rest of the file. When finished compiling the
# stats for the first app and creating the corresponding
formatted_target,
# we'll then check to see if other apps exist, and perform the same
# task for each sequential app.
############################################################

this_line=1            # reset to parse through
raw_target
master_pointer=1
lines_in_master=$(cat $raw_target | wc -1)  # reset it for
raw_target
                                   # start 110298
############################################################

# Putting in check to see if event/date combo was found.
############################################################

if [[ $lines_in_master -eq 0 ]]
then
     echo "No occurrences of $target_company between
$user_friendly_start_date and $user_friendly_end_date."
     echo "Exiting from program!"
     exit 0
fi
                                   # end 110298
echo " ">$history_file   # Create new history file
while [[ $continue -eq 1 ]]  # this loop runs once for each
app/event combo
do
     echo "Formatting. Considering line $this_line of
$lines_in_master."
############################################################

     # initialize our variable for each app/event combo:
############################################################

```

```
            event_hits=0
#####################################################

        # get the name of each app. This will be used for comparison
purposes.
#####################################################

        this_app=$(head -n $master_pointer $raw_target | tail -n 1 | cut
-f 3 -d ",")
#####################################################

        # get the name of event:
#####################################################

        this_event=$(head -n $this_line $raw_target | tail -n 1 | cut -f 4
-d ",")
#####################################################

        # pull off the number of hits. Note that we'll only record this
if
        # we need to. The new grep function seems to take care of this.
#####################################################

        # event_hits=$(head -n $this_line $raw_target | tail -n 1 | cut -f
5 -d ",")
#####################################################

        # if we've already created a template for this application, we
don't
        # want to create another one. Check and see if this app exists
within
        our history file. This keeps us from creating a new template
for
        # each line of the raw_target.
#####################################################

        grep -1 $this_app $history_file >/dev/null
#040198a
        if [[ $? -eq 0 ]]   # term was found in history file
#040198a
        then
#040198a
            template_needed=0
#040198a
                #####################################################
                # Now see if event is found also, by doing a similar grep.
                #####################################################
            grep $this_event $history_file | grep $this_app > /dev/null
#040198a
                    #040998 "1" flag removed from above
grep
            if [[ $? -eq 0 ]]               # term was found in history file
#040198a
            then
#040198a
                record_combo=0
#040198a
            fi
#040198a
        fi              # finished this app
#040198a
#       echo "$this_event $this_app needs recording:
$record_combo">>/tmp/debug.info
# Above line commented out: 062998
#       for history_text in `cat $history_file`
#       do
#           if [[ $(echo $history_text | cut -f 1 -d ",") = $this_app ]]
#           then    # no new template needed
#               template_needed=0

#####################################################
#               # We now know that no template is need, as we've considered
this app
#               # before, so the question becomes whether or not we've actually
created
#               # an entry line for this app/event combo before. Continue our
search
#               # within this "if" statement, to see if we can match the event
as
#               # well. #040198
#####################################################
#           if [[ $(echo $history_text | cut -f 2 -d ",") =
$this_event ]] #040198
#           then            # we've already dane this app/event combo
#040198
#               record_combo=0
#040198
#           fi          # end "if event matches"
#040198

#       fi              # end "if app matches"
#       done
        if [[ $template_needed -eq 1 ]]
        then
                # move existing file into .old   #033098
                if [ -w $formatted_target.$this_app ]
then
                    mv $formatted_target.$this_app
$formatted_target.$this_app.old
                fi
                # create a template and mark it in our files_to_print:
                echo "$formatted_target.$this_app">>$files_to_print
                echo " ">$formatted_target.$this app
                echo "           dtprint Event
Report">>$formatted_target.$this_app
                echo "System: `hostname`           Printed:
`date`">>$formatted_target.$this_app
                echo "Activity From: $user_friendly_start_date    To:
$user_friendly_end_date">>$formatted_target.$this_app
                echo "Application: $this app">>$formatted_target.$this_app
                echo
"----------------------------------------------------------------
-------">>$formatted_target.$this_app
                echo "
|">>$formatted_target.$this app
                echo "       Event
Event">>$formatted_target.$this_app
                echo "       Name
Count">>$formatted_target.$this_app
                echo "
|">>$formatted_target.$this_app
                echo
"----------------------------------------------------------------
-------">>$formatted_target.$this_app
                echo "
|">>$formatted_target.$this_app
        fi          # finished creating template
#####################################################
########
        # We now need to insert the "filling" into the template for each
event.
        # We will do this by remembering where we started
($master_pointer),
        # and parsing down through the rest of the raw_target, looking for
any other
        # entries (from different days) that have the same application
name and event
        # name. If we find them, we will add the event count to the total
count
        # (event_hits) . When we reach the end of the file, we'll print it
off
        # to the formatted target, then move to the next application/event
combo.
        #
        # To keep from "restarting" an app/event count, and creating
duplicate
        # entries on the formatted target, e.g.,
        #
        # 03.13 AmericanGas,ThisEvent,5
```

-continued

```
    # 03.12 AmericanGas,ThisEvent,6
    #
    # resulting in:    AmericanGas, ThisEvent 11
    #                  AmericanGas, ThisEvent 6
    #
    # we wiil keep a history file in which we record all the
already-considered
    # application/event combinations.
####################################################
########
####################################################
########
    #now search downward for each occurrence of this app/event combo
(which
    # would correspond to different date entries). If it occurs
again, add
    # the new number to the previously existing event_hits value.
Note (as
    #seen above, this is only done IF we've not previously considered
this
    # app and event combo.
####################################################
########
        if [[ record_combo -eq 1 ]]
        then
            # dump all occurrences of this event and app into
interim_target
            grep $this_app $raw_target | grep $this_event >
$interim_target #040198
            # An interesting note here: the cut below was interpreting
whitespace
            # as a newline. Will sed that whitespace out of interim target.
            mv $interim_target $interim_target.tmp
            #040198a
            sed -e "s/ /,/g"$interim_target.tmp > $interim_target
            #040198a
            # now continue working
            for i in 'cat $interim_target'
            #040198
                do
                #040198
                    event_hits=$event_hits+$(echo $i | cut -f 6 -d ",")
                #040198
                done
            #040198
#    while [[ $this_line -lt. $lines_in_master ]] # NOTE
#    do
#        this line=$this_line+1   # move to next line
#        # echo "Considering line number $this_line"
#        # if event matches AND app matches:
#        if [[ $(head -n $this_line $raw_target | tail -n 1 | cut
-f 4 -d ",") = $this_event ]] &&
#            [[ $(head -n $this_line $raw_target | tail -n 1 | cut -f
3 -d ",") = $this_app ]]
#        then
#            # we have a match
#            event_hits=$event_hits+$(head -n $this_line $raw_target
| tail -n | cut -f 5 -d ",")
#            # echo "A match on event_hits. Pres return to
continue.
#            # echo "event_hits is $event_hits."
#            # read
#        fi
#    done      # done parsing entire file for this event/app combo
####################################################
########
        # At this point, we've finished the "for" loop above, so we've
found all
        # occurrences of "this_app" and "this_event" in our target. Go
ahead and
        # drive a stake in the ground . . . send it to the $formatted_target
file and
        # also write it out to the history file, so we don't re-record the
same
        # event/app combo while performing a later parse.
        #
        # First format the tabs so they are consistent:
####################################################
########
            if [[ $(echo $this_event | wc -c) -le 8 ]]
        then
                echo "    $this_event           |
$event_hits">>$formatted_target.$this_app
            else
                echo "    $this_event           |
$event_hits">>$formatted_target.$this_app
            fi
            # now, to the history file:
            echo "$this_app,$this_event">>$history_file
            echo
"--------------------------------------------------------
-------">>$formatted_target.$this_app
        fi      # the new end of the "if record_combo -eq 1" statement
        # move master_pointer to the next line
        master_pointer=$master_pointer+1
        # and this_line back to master_pointer
        this_line=$master_pointer
        # reset our flags:
        record_combo=1
        template_needed=1
        if [[ $master_pointer -gt $lines_in_master ]]       # shouldn't be
greater
        then
            continue=0
        fi
done
rm $history_file        # clean . . .
echo " "
echo "Finished formatting. Sending these files to the printer:"
for i in $files_to_print'
do
    echo "     $i"
    qprt -c $i
done

```

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing phone activity records in an automated voice processing system, comprising the steps of:

creating a first file containing phone activity records corresponding to a first period of time;

appending the first file to a master file;

after appending the first file, overwriting the first file by a second file containing phone activity records for a second period of time; and appending the second file to the master file.

2. The method as recited in claim 1, further comprising, responsive to user selected criteria, parsing the master file to find requested events.

3. The method as recited in claim 2, further comprising presenting the requested events to a user.

4. A method for managing phone activity records in an automated voice processing system, comprising the steps of:
- receiving phone calls;
- processing and recording events generated by said phone calls;
- collecting and recording to an archive file the number of each type of event corresponding to a particular client for a first time interval, wherein the archive file is periodically overwritten by information corresponding to a second time interval;
- appending the archive file to a master file prior to overwriting the archive file with new information wherein the master file is not overwritten and contains open-ended historical data.

5. The method as recited in claim 4, further comprising, responsive to user selected criteria, parsing the master file to find requested events.

6. The method as recited in claim 5, further comprising presenting the requested events to a user.

7. A method for managing phone activity records in an automated voice processing system, comprising the steps of:
- in response to an event, archiving phone activity records over a time period into an archive file, wherein a plurality of archive files are formed;
- concatenating the archived files together into a master file;
- responsive to user selected criteria, parsing the master file to find requested events; and
- presenting the requested events to a user;
- wherein said each archive file of said plurality of archive files is saved over a previous archive file, thereby destroying the previous file such that at any given time only one archive file exists.

8. A method for managing phone activity records in an automated voice processing system, the method comprising:
- periodically writing, into a first file, phone activity data from the automated voice processing system wherein the phone activity data corresponds to a period of time, wherein prior data in the first file is overwritten each new time phone activity data is written into the first file; and
- prior to data being overwritten in the first file, placing the phone activity data from the first file into a master file with prior phone activity, wherein the master file provides a history of phone activity within the automated voice processing system.

9. A computer program product in computer readable media for use in a data processing system for managing phone activity records in an automated voice processing system, the computer program product comprising:
- first instructions for creating a first file containing phone activity records corresponding to a first period of time;
- second instructions for appending the first file to a master file;
- third instructions, after appending the first file, for overwriting the first file by a second file containing phone activity records for a second period of time; and
- fourth instructions for appending the second file to the master file.

10. The computer program product as recited in claim 9, further comprising fifth instructions, responsive to user selected criteria, for parsing the master file to find requested events.

11. The computer program product as recited in claim 10, further comprising sixth instructions for presenting the requested events to a user.

12. A system for managing phone activity records in n automated voice processing system, comprising:
- means for creating a first file containing phone activity records corresponding to a first period of time;
- means for appending the first file to a master file;
- means, after appending the first file, for overwriting the first file by a second file containing phone activity records for a second period of time; and
- means for appending the second file to the master file.

13. The system as recited in claim 12, further comprising means, responsive to user selected criteria, for parsing the master file to find requested events.

14. The system as recited in claim 13, further comprising means for presenting the requested events to a user.

* * * * *